(12) United States Patent
Petersen

(10) Patent No.: US 10,790,742 B1
(45) Date of Patent: Sep. 29, 2020

(54) MULTI-LEVEL POWER CONVERTER WITH IMPROVED TRANSIENT LOAD RESPONSE

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/386,761

(22) Filed: Apr. 17, 2019

(51) Int. Cl.
*H02M 3/07* (2006.01)

(52) U.S. Cl.
CPC ........ *H02M 3/07* (2013.01); *H02M 2003/072* (2013.01)

(58) Field of Classification Search
CPC ......... H02M 3/156–1588; H02M 3/07; H02M 1/088; H02M 2003/072
See application file for complete search history.

(56) References Cited

U.S. PATENT DOCUMENTS

| | | | |
|---|---|---|---|
| 7,230,405 B2 | 6/2007 | Jang et al. | |
| 9,768,682 B2 * | 9/2017 | Banag | H02M 3/07 |
| 10,218,255 B1 * | 2/2019 | Petersen | H02M 3/1582 |
| 10,256,729 B1 * | 4/2019 | Notsch | H02M 1/14 |
| 10,291,117 B2 * | 5/2019 | Petersen | H02M 3/158 |
| 2008/0079393 A1 | 4/2008 | Spartano | |
| 2008/0157732 A1 | 7/2008 | Williams | |
| 2008/0158915 A1 | 7/2008 | Williams | |
| 2009/0033289 A1 | 2/2009 | Xing et al. | |
| 2009/0174466 A1 | 7/2009 | Hsieh et al. | |
| 2010/0188065 A1 | 7/2010 | Shiwaya | |
| 2011/0062940 A1 | 3/2011 | Shvartsman | |
| 2013/0147543 A1 | 6/2013 | Dai | |
| 2014/0070787 A1 | 3/2014 | Arno | |
| 2015/0061613 A1 | 3/2015 | Kondou | |
| 2015/0280553 A1 | 10/2015 | Giuliano et al. | |
| 2015/0311793 A1 | 10/2015 | Khayat et al. | |
| 2016/0344214 A1 * | 11/2016 | Petersen | H02M 3/158 |
| 2017/0244318 A1 | 8/2017 | Giuliano | |

(Continued)

OTHER PUBLICATIONS

"Multi-Level Conversion: High Voltage Choppers and Voltage-Source Inverters," by T.A. Meynard et al, PESC '92 Record, 23rd Annual IEEE Power Electronics Specialists Conference, Jun. 29-Jul. 3, 1992, pp. 397-403.

(Continued)

*Primary Examiner* — Jue Zhang
(74) *Attorney, Agent, or Firm* — Saile Ackerman LLC; Stephen B. Ackerman

(57) ABSTRACT

A multi-level power converter and method are presented. The converter provides a ground terminal, an input terminal and an output terminal. It also provides an inductor, a first flying capacitor, a second flying capacitor and a network of switches. The network of switches is driven with a sequence of states including a first state and a second state. In the first state one of the input terminal and the ground terminal is coupled to the output terminal via a first path containing the first flying capacitor and which bypasses the inductor, while the remaining terminal among the input terminal and the ground terminal is coupled to the output terminal via a second path containing the second flying capacitor and the inductor.

19 Claims, 11 Drawing Sheets

(56) References Cited

U.S. PATENT DOCUMENTS

2017/0302093 A1* 10/2017 Petersen ............... H02J 7/0029
2018/0175726 A1* 6/2018 Petersen ................ H02M 3/07

OTHER PUBLICATIONS

"Three-Level Buck Converter for Envelope Tracking Applications," by Vahid Yousefzadeh et al., IEEE Transactions on Power Electronics, vol. 21, No. 2, Mar. 2006, pp. 549-552.

"A Fully-Integrated 3-Level DC-DC Converter for Nanosecond-Scale DVFS," by Wonyoung Kim et al., IEEE Journal of Solid-State Circuits, vol. 47. No. 1, Jan. 2012, pp. 206-219.

"Zero Inductor Voltage Multilevel Bus Converter," by Samuel Webb et al. 2018 IEEE Applied Power Electronics Conference and Exposition (APEC), Mar. 4-8, 2018, pp. 2175-2182.

"A Hybrid Inductor-Based Flying-Capacitor-Assisted Step-Up/Step-Down DC-DC Converter with 96.56% Efficiency," by Yong-Min Ju et al., 10.4, 2017 IEEE International Solid-State Circuits Conference, Feb. 5-9, 2017, pp. 184-186.

"A Hybrid Dual-Path Step-Down Converter with 96.2% Peak Efficiency Using a 250mΩ Large-DCR Inductor," by Yeunhee Huh et al., 2018 Symposium on VLSI Circuits, Jun. 18-22, 2018, pp. 225-226.

"A Hybrid Structure Dual-Path Step-Down Converter with 96.2% Peak Efficiency Using a 250-mΩ Large-DCR Inductor," by Yuenhee Huh et al., IEEE Journal of Solid-State Circuits, vol. 54, No. 4, Apr. 219, pp. 959-967.

"Split-Phase Control: Achieving Complete Soft-Charging Operation of a Dickson Switched-Capacitor Converter," by Yutian Lei et al., IEEE Transactions on Power Electronics, vol. 31, No. 1, Jan. 2016, pp. 770-782.

"Fully Inegrated Buck Converter with 78% Efficiency at 365 mW Output Power Enabled by Switched-Inductor-Capacitor Topology and Inductor Current Reduction Technique," by Nghia Tang et al., 2019 IEEE International Solid-State Circuits Conference—(ISSCC), Feb. 2019, pp. 152-154.

USPTO Office Action, U.S. Appl. No. 16/386,770, Applicant: Petersen, Holger, dated Oct. 17, 2019, 18 pages.

Co-pending US Patent, U.S. Appl. No. 16/386,770, filed Apr. 17, 2019, "A Power Converter," by Holger Petersen, 26, pages.

Co-pending US Patent, U.S. Appl. No. 16/386,735, filed Apr. 17, 2019, "A Power Converter," by Holger Petersen, 26, pages.

PTO Office Action, U.S. Appl. No. 16/386,770, Applicant: Holger Petersen, dated Feb. 10, 2020, 21 pages.

Notice of Allowance, U.S. Appl. No. 16/386,770, First Named Inventor: Holger Petersen, dated Apr. 20, 2020, 14 pages.

U.S. Office Action, U.S. Appl. No. 16/386,770, Applicant: Holger Petersen, dated Oct. 17, 2019, 17 pages.

* cited by examiner

MULTI-LEVEL POWER CONVERTER WITH IMPROVED TRANSIENT LOAD RESPONSE

RELATED PATENT APPLICATIONS

This application is related to application Ser. No. 16/386,770, filed on Apr. 17, 2019, and to application Ser. No. 16/386,735 filed on Apr. 17, 2019, assigned to a common assignee, and which are incorporated by reference in their entirety.

TECHNICAL FIELD

The present disclosure relates to a power converter and a method of operating the same. In particular, the present disclosure relates to a multi-level power converter with improved transient load response.

BACKGROUND

In recent years, portable computing devices including smartphones, tablets and notebooks have increased their computing power, screen resolution and display frame rate. These advancements have been enabled by sub-micron range silicon technology approaching 10 nm and below and allowing the formation of ultra-narrow gate structures. Ultra-narrow gate structures exhibit increased leakage current for each transistor.

In view of the fact that central processing units (CPUs) and graphical processing units (GPUs) are composed from multiple hundred million transistors, the leakage current of a modern microprocessor is significant. To reduce battery consumption, the embedded computing cores are typically disconnected from the power supply as often as possible. As a result, the required computing power is provided within short bursts of operation. Hence, the power profile of a modern mobile computing device is dominated by relatively long periods of standby currents in the mA range, interrupted by pulses of high peak currents (in the 20 A and higher range). The challenge for a power management unit is the provision of low currents at high conversion efficiency to optimize battery life time, combined with the provision of high currents without saturation effects and at a stable output voltage.

One solution to avoid saturation and high resistive losses in the current trace from the battery is the usage of a battery pack with cells connected in series. For Li-Ion/Li-Poly cells this results to nominal battery pack voltages of approximately N×3.7V (with N being the number of cells). For example, a voltage of 7.4V can be obtained for a pack with 2 cells in series (2S) or a voltage of 11V for a pack with 3 cells connected in series (3S). The dominant current consumption is typically caused by the processor, comprising transistors that can only sustain voltages at or even below the 1V range. This triggers substantial voltage conversion ratios that cannot be provided efficiently by DC-DC converters build with relatively large switches having a high voltage rating and consuming high gate charge for each switching operation. As a result, standards buck converters tend to switch at relatively low frequency, therefore requiring coils with high inductance to limit current ripples. These high inductance coils are typically large, especially when high peak current needs to be provided.

The above challenge may be addressed by providing an intermediate rail between the output voltage of the battery pack and the processor input voltage. This approach enables the use of DCDC converters with switches of reduced voltage rating that can be switched faster for the same switching loss. As a result, a lower inductance may be used. The lower inductance reduces the DC resistance of the coil allowing higher peak current to be reached.

For instance, mobile computing devices may implement a 5V or a 3.3V intermediate bus. The usage of standard (inductive) buck converters with power capability larger than the processor peak load suffers from the above limitations and the converter is either large or implements poor light load efficiency.

When the intermediate bus follows the battery pack voltage, an unregulated capacitive voltage divider can provide high efficiency over a wide current range and without the need for a bulky inductor. For instance, for a 2:1 converter the output of a 2S battery pack can be converted to the typical voltage range of a 1S pack, enabling the usage of standard low voltage PMICs. However, the lack of regulation can result in issues when the battery pack is deeply discharged (e.g. towards 5V). As the converter provides a 2:1 reduced output voltage, the output voltage can drop further for example by 100-300 mV when a load current is pulled. Such a low bus voltage is typically below the undervoltage lockout threshold of cascaded power converters.

Regulation can be added by using a 3-Level DCDC Converter as described in US2018175726. The efficiency of a Multi-Level Converter is typically below the efficiency of an unregulated capacitive voltage divider using similar switches. This is caused by the inductor direct current resistance (DCR) and the inductor magnetic core losses. The maximum output current of a traditional Multi-Level Converter is limited by the current rating of its inductor.

To increase peak current capability such a converter needs to use larger inductors or route the total current through multiple inductors. This results in an increased PCB printed circuit board (PCB) area and an increased bill of materials (BOM).

When the conversion ratio $V_{in}/V_{out}$ is the range of 2:1 (or 1:2 in case of reverse operation), the converter of US2018175726 allows reducing the current through the inductor to a fraction of the converter output current. The reduced inductor current results in reduced inductor DCR loss and improved converter efficiency.

However, applications that are sensitive to current ripple may require large input capacitance or ferrite bead to address the pulsed current pulled by the converter. For conversion ratios $V_{in}/V_{out}$ closer to 1:1 or 1:0 the approach US2018175726 is limited by increased switch conduction losses in comparison with traditional 3-Level DCDC Converter topologies.

SUMMARY

According to a first aspect of the disclosure there is provided a power converter having a ground terminal, an input terminal for receiving an input voltage and an output terminal for providing an output voltage with a target conversion ratio, the power converter comprising an inductor; a first flying capacitor selectively coupled to the inductor; a second flying capacitor selectively coupled to the inductor; a network of switches; and a driver adapted to drive the network of switches with a sequence of states during a drive period, the sequence of states comprising a first state and a second state, wherein in the first state one of the input terminal and the ground terminal is coupled to the output terminal via a first path comprising the first flying capacitor and which bypasses the inductor, and wherein the remaining terminal among the input terminal and the ground terminal is coupled to the output terminal via a second path comprising the second flying capacitor and the inductor.

Optionally, in the second state one of the input terminal and the ground terminal is coupled to the output terminal via a third path comprising the second flying capacitor and which bypasses the inductor, wherein the remaining terminal among the input terminal and the ground terminal is coupled to the output terminal via a fourth path comprising the first flying capacitor and the inductor.

Optionally, the sequence comprises an intermediate state, the driver being adapted to select the intermediate state among a plurality of intermediate states based on the target conversion ratio.

Optionally, the intermediate state may be provided between the first state and the second state. For example, a sequence may start with the first state, followed by the intermediate state, then by the second state and finish by the intermediate state.

Optionally, the intermediate state is a magnetization state in which the input terminal is coupled to the output terminal via at least one of the first path and the third path and wherein the input terminal is additionally coupled to the output via a fifth path comprising the inductor.

Optionally, the intermediate state is a de-magnetization state in which the input terminal is coupled to the output terminal via at least one of the first path and the third path and wherein the ground terminal is coupled to the output terminal via a sixth path comprising the inductor.

Optionally, the driver is adapted to maintain the first state and the second state for a predetermined duration during the drive period. The predetermined duration may be set based on the conversion ratio. The predetermined duration may be different for the first state and the second state. For instance, the second state may be maintained longer than the first state.

Optionally, the driver is adapted to change a duration of the intermediate state based on the target conversion ratio.

Optionally, in the second state the input terminal is coupled to the output terminal via a seventh path comprising the second flying capacitor and the inductor and the ground terminal is coupled to the output terminal via an eighth path comprising the first flying capacitor and the inductor.

Optionally, the network of switches comprises a first input switch to couple the first flying capacitor to the input terminal; a second input switch to couple the second flying capacitor to the input terminal; a first ground switch to couple the first flying capacitor to the ground terminal; a second ground switch to couple the second flying capacitor to the ground terminal; wherein the inductor has a first terminal and a second terminal the second terminal being coupled to the output terminal.

Optionally, each one of the first flying capacitor and the second flying capacitor has a first terminal selectively coupled to the input terminal and a second terminal selectively coupled to the ground terminal; wherein the network of switches comprises a first capacitor switch coupled to the first terminal of the first flying capacitor; a second capacitor switch coupled to the first terminal of the second flying capacitor; a third capacitor switch coupled to the second terminal of the first flying capacitor; and a fourth capacitor switch coupled to the second terminal of the second flying capacitor.

Optionally, the third capacitor switch and the fourth capacitor switch are coupled to the output terminal.

Optionally, the first terminal of the inductor is coupled to the first flying capacitor via the first capacitor switch and to the second flying capacitor via the second capacitor switch.

Optionally, the power converter comprises a first de-magnetization switch provided between the first terminal of the inductor and the ground terminal or between the first terminal of the inductor and the first ground switch.

Optionally, the power converter comprises a second de-magnetization switch provided between the first terminal of the inductor and the second ground switch.

Optionally, the first capacitor switch and the second capacitor switch are coupled to the output terminal, and the first terminal of the inductor is coupled to the first flying capacitor via the third capacitor switch and to the second flying capacitor via the fourth capacitor switch; wherein the converter further comprises a magnetization switch coupled to the first terminal of the inductor.

Optionally, the magnetization switch is coupled to the input terminal or to the first terminal of the first or second flying capacitor.

Optionally, the first terminal of the inductor is coupled to the first flying capacitor via the first capacitor switch and the third capacitor switch; and wherein the first terminal of the inductor is coupled to the second flying capacitor via the second capacitor switch.

Optionally, the first terminal of the inductor is coupled to the first flying capacitor via the third capacitor switch and to the second flying capacitor via the second capacitor switch and the fourth capacitor switch; wherein the first capacitor switch is coupled to the output terminal.

According to a second aspect of the disclosure, there is provided a method of converting power with a target conversion ratio, the method comprising providing a ground terminal, an input terminal for receiving an input voltage and an output terminal for providing an output voltage; providing an inductor; providing a first flying capacitor selectively coupled to the inductor; providing a second flying capacitor selectively coupled to the inductor; providing a network of switches; driving the network of switches with a sequence of states during a drive period, the sequence of states comprising a first state and a second state; wherein in the first state one of the input terminal and the ground terminal is coupled to the output via a first path comprising the first flying capacitor and which bypasses the inductor, and wherein the remaining terminal among the input terminal and the ground terminal is coupled to the output via a second path comprising the second flying capacitor and the inductor.

Optionally, in the second state one of the input terminal and the ground terminal is coupled to the output terminal via a third path comprising the second flying capacitor and which bypasses the inductor, and wherein the remaining terminal among the input terminal and the ground terminal is coupled to the output terminal via a fourth path comprising the first flying capacitor and the inductor.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DESCRIPTION

Figure 1:
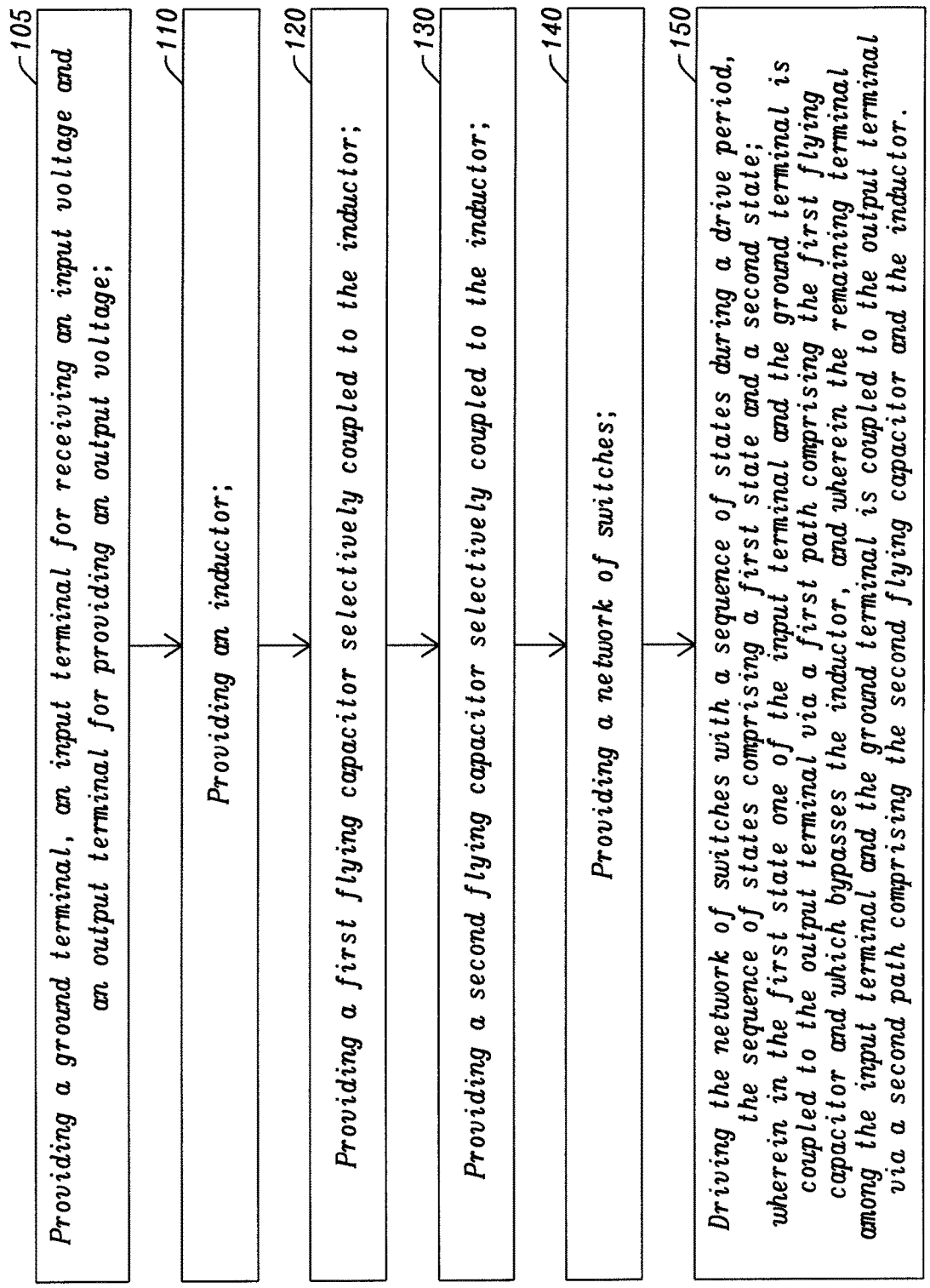
FIG. 1 is a flow chart of a method for converting power with a target conversion ratio.

FIG. 1 is a flow chart of a method for converting a voltage with a target conversion ratio. At step 105 a ground terminal, an input terminal for receiving an input voltage and an output terminal for providing an output voltage are provided. At step 110 an inductor is provided. At step 120 a first flying capacitor selectively coupled to the inductor is provided. At step 130 a second flying capacitor selectively coupled to the inductor is provided. At step 140 a network of switches is provided. At step 150 the network of switches is driven with a sequence of states during a drive period. The sequence of states comprises a first state and a second state. In the first state either the input terminal or the ground terminal is coupled to the output terminal via a first path comprising the first flying capacitor and which bypasses the inductor. In the first state the remaining terminal among the input terminal and the ground terminal is coupled to the output terminal via a second path comprising the second flying capacitor and the inductor.

Various second states may be used. For instance, in the second state the input terminal may be coupled to the output terminal via a third path comprising the second flying capacitor and which bypasses the inductor. In the second path the ground terminal may be coupled to the output terminal via a fourth path comprising the first flying capacitor and the inductor.

Figure 2A:
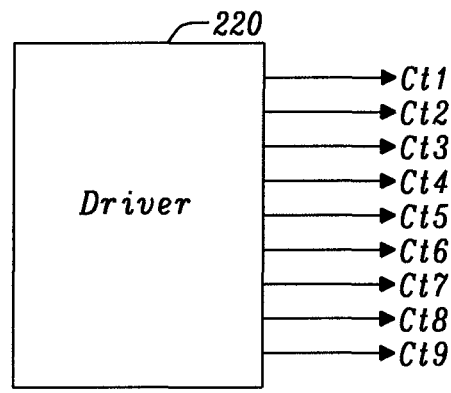
FIGS. 2A and 2B are diagrams of a DC-DC converter for implementing the method of FIG. 1.
Figure 2B:
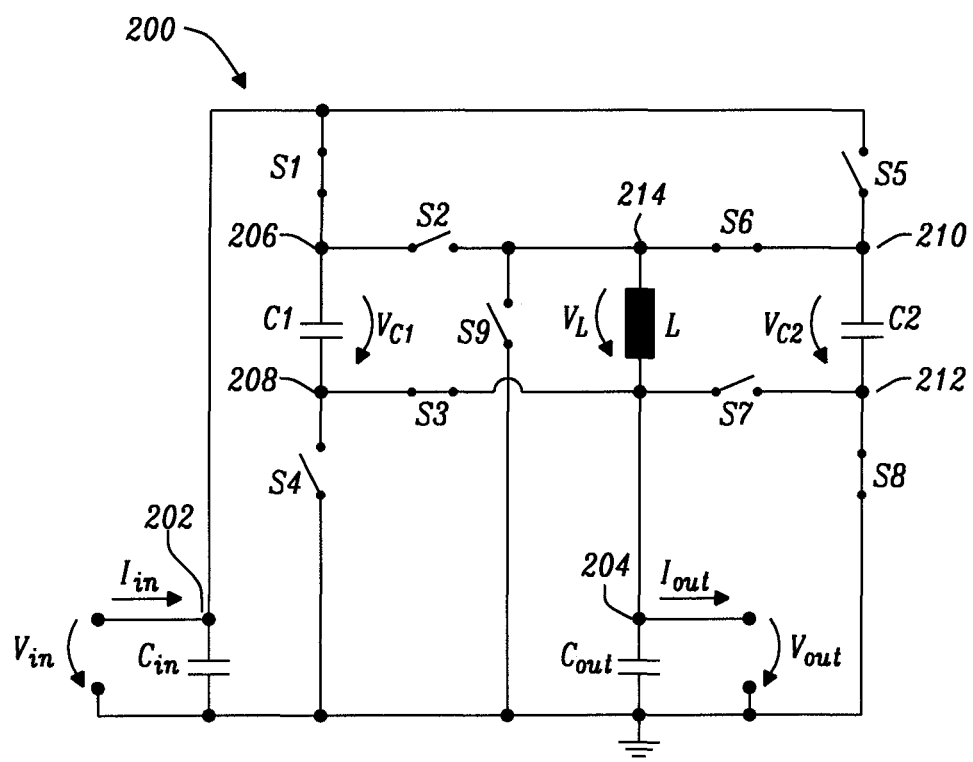

FIG. 2B is a diagram of a DC-DC converter 200 for implementing the method of FIG. 1. The DC-DC converter 200 includes two capacitors C1 and C2 and an inductor L coupled between an input node 202 and an output node 204 via a network of switches formed by nine switches S1, S2, S3, S4, S5, S6, S7, S8 and S9. An input capacitor Cin is provided between the input node 202 and ground and an output capacitor Cout is provided between the output node 204 and ground. The switch S9 is optional and may be used to provide a body diode current during dead time. For instance, for a conversion ratio $$\frac{V_{in}}{V_{out}} \leq 2,$$

the switch S9 may not be required. The capacitors Cin and Cout are connected to a fixed ground voltage and may be referred to as reservoir capacitors. The capacitors C1 and C2 have terminals provided with varying voltages and may be referred to as flying capacitors.

The first flying capacitor C1 is coupled to the input node 202 via the switch S1 and to ground via the switch S4. Similarly, the second flying capacitor C2 is coupled to the input node 202 via the switch S5 and to ground via the switch S8. The first flying capacitor C1 has a first terminal coupled to node 206 and a second terminal coupled to node 208. The second flying capacitor C2 has a first terminal coupled to node 210 and a second terminal coupled to node 212.

The inductor L has a first terminal at node 214 and a second terminal coupled to the output node 204. The first terminal at node 214 is coupled to node 206 via the switch S2 and to node 210 via the switch S6. The output terminal at node 204 is coupled to node 208 via the switch S3 and to node 212 via the switch S7. A single switch S9 couples the first terminal of inductor L to ground. A driver 220 is provided to generate a plurality of control signals Ct1, Ct2, Ct3, Ct4, Ct5, Ct6, Ct7, Ct8, Ct9 to operate the switches S1-S9 respectively. The driver 220 in FIG. 2A is adapted to operate the DC-DC converter 200 with a sequence of states.

Figure 3A:
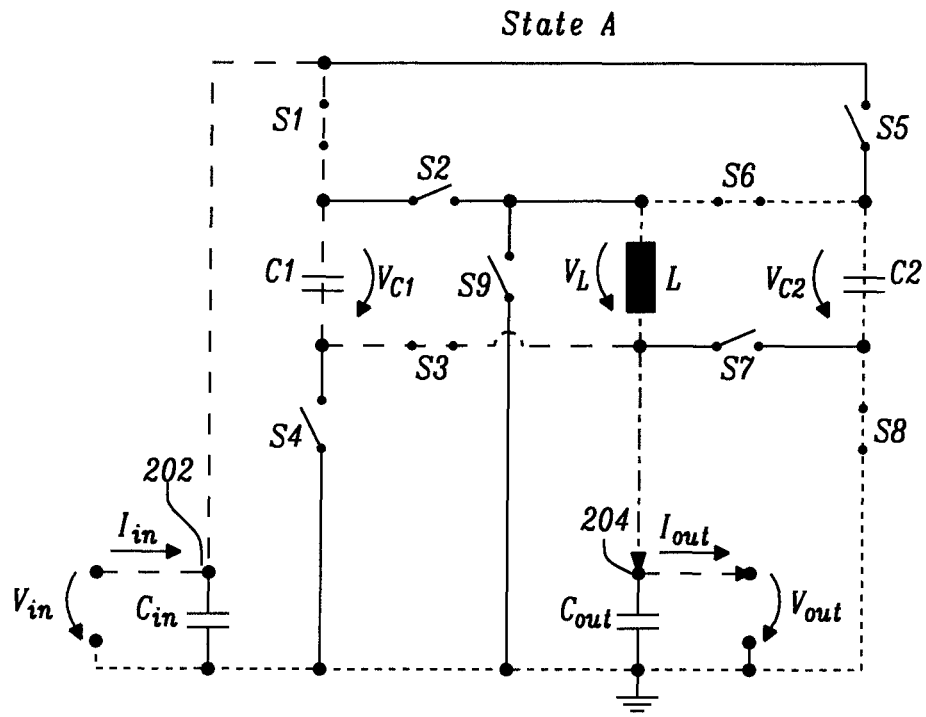
FIG. 3A is a diagram of the DC-DC converter of FIG. 2 operating in a first state.

FIG. 3A illustrates the DC-DC converter of FIG. 2 operating in a first main state also referred to as state A, in which the switches S1, S3, S6 and S8 are closed while the remaining switches S2, S4, S5, S7 and S9 are open. In state A the input node 202 is coupled to the output node 204 via a first path comprising the switch S1, the first flying capacitor C1 and the switch S3. The ground is coupled to the output node 204 via a second path that includes the switch S8, the second flying capacitor C2, the switch S6 and the inductor L.

Figure 3B:
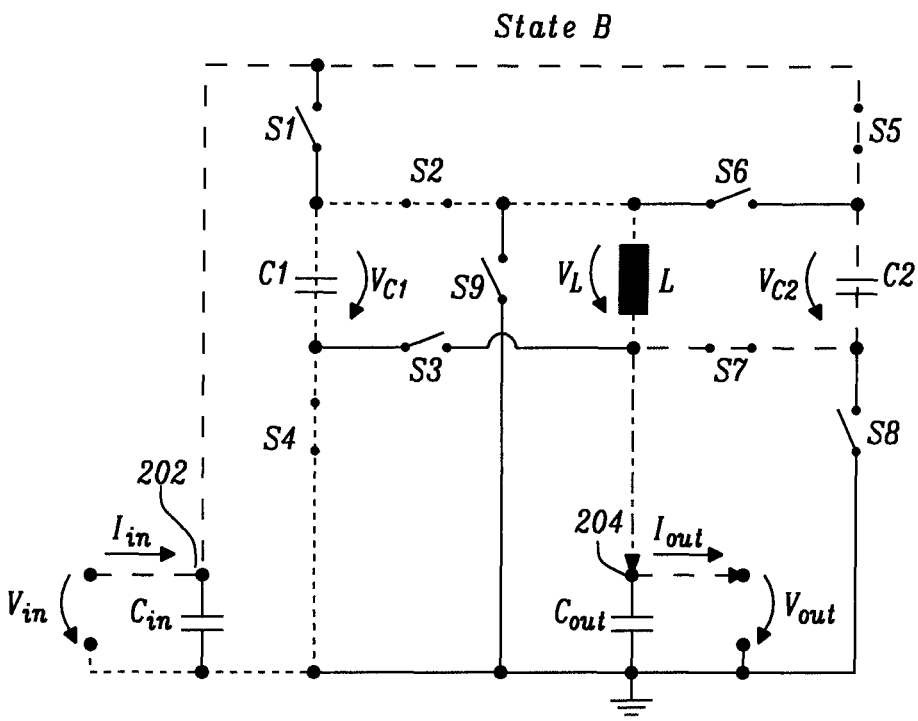
FIG. 3B is a diagram of the DC-DC converter of FIG. 2 operating in a second state.

FIG. 3B illustrates the DC-DC converter of FIG. 2 operating in a second main state also referred to as state B, in which the switches S2, S4, S5, and S7 are closed while the remaining switches S1, S3, S6, S8 and S9 are open. In state B the input node 202 is coupled to the output node 204 via a third path comprising the switch S5, the second flying capacitor C2 and the switch S7. The ground is coupled to the output node 204 via a fourth path comprising the switches S2 and S4, the first flying capacitor C1, and the inductor L.

The driver is therefore configured to performed so called interleaved switching, such that when the first flying capacitor pulls a current from the input, the second flying capacitor pulls a current from ground and vice versa.

The voltages $V_{C1}$ and $V_{C2}$ across the flying capacitor C1 and C2 are defined by equation 1 as:

$$V_{C1} = V_{C2} = V_{in} - V_{out} \tag{1}$$

The voltage $V_L$ across L can be expressed as:

$$V_L = V_{C2} - V_{out} \tag{2}$$

Therefore $V_L$ may be either positive or negative depending on the value of $V_{out}$.

The DC-DC converter 200 may dissipate energy due to conduction losses through the switches, the inductor and the flying capacitors as well as core losses due to energy dissipated through the core of the inductor L. When the conversion ratio is $$\frac{V_{in}}{V_{out}} = 2, V_{C1} = V_{C2} = V_{in}/2.$$

As a result $V_L=0$ and the DC-DC converter has no inductor core losses. The low side switches S3, S4, S7 and S8 are rated for a voltage $V_{out}$.

Figure 4A:
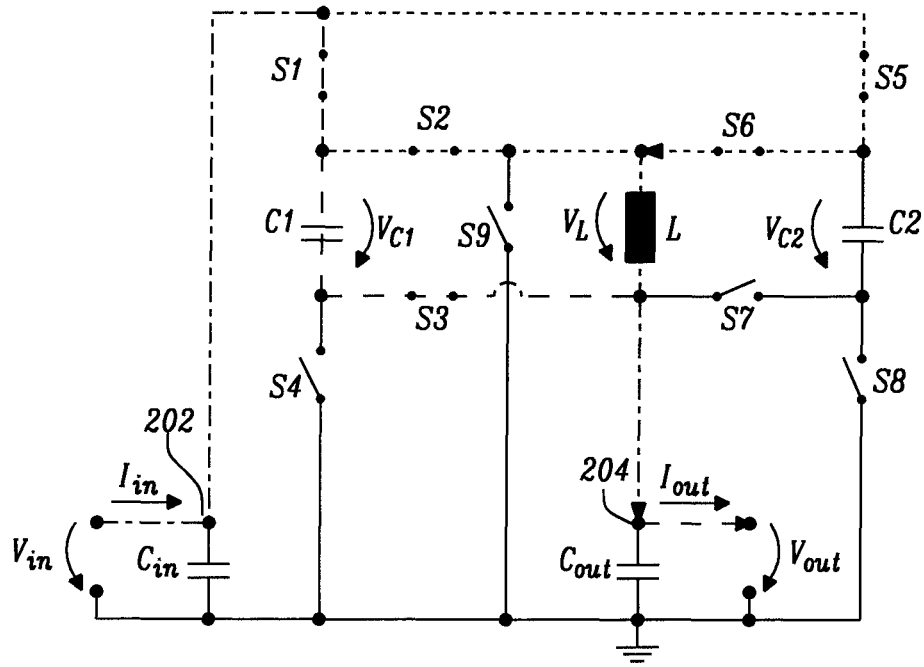
FIG. 4A is a diagram of the DC-DC converter of FIG. 2 operating in an intermediate magnetization state.

FIG. 4A illustrates a diagram of the DC-DC converter of FIG. 2 operating in an intermediate magnetization state referred to as state I1. The switches S1, S2, S3, S5 and S6 are closed while the remaining switches S4, S7, S8 and S9 are open. In the intermediate state I1 the input node 202 is coupled to the output node 204 via three paths that include the first path (comprising the switch S1, the first flying capacitor C1 and the switch S3) and two magnetization paths in parallel defined by the switches S1, S2, L and by S5, S6, L respectively.

Figure 4B:
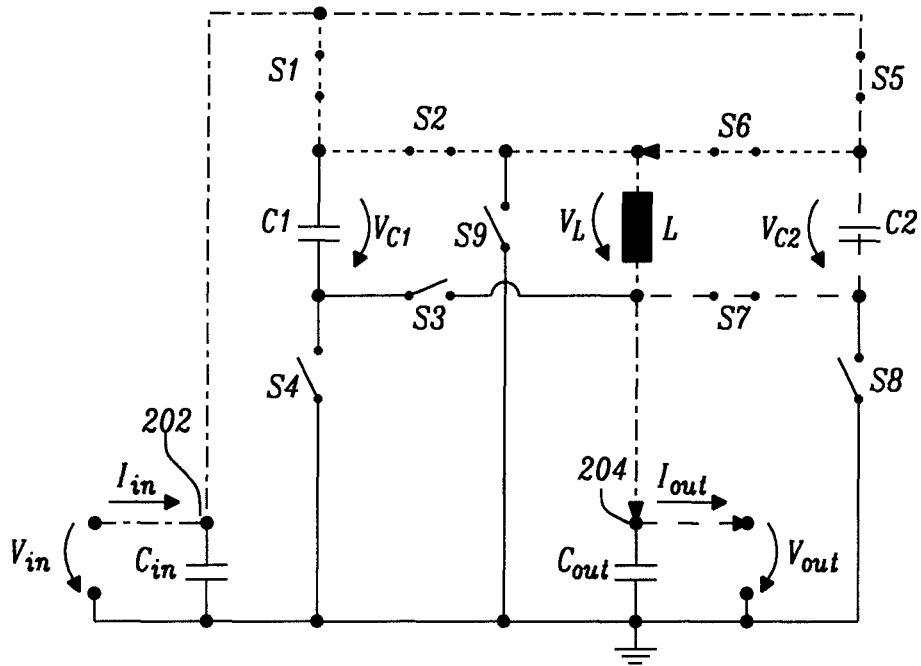
FIG. 4B is a diagram of the DC-DC converter of FIG. 2 operating in another intermediate magnetization state.

FIG. 4B illustrates a diagram of the DC-DC converter of FIG. 2 operating in another intermediate magnetization state referred to as state I2. The switches S1, S2, S5, S6 and S7 are closed while the remaining switches S3, S4, S8 and S9 are open. In the intermediate state I2 the input node 202 is coupled to the output node 204 via three paths that include the third path (comprising the switch S5, the second flying capacitor C2 and the switch S7) and the two magnetization paths defined by the switches S1, S2, L and S5, S6, L respectively.

Figure 5A:
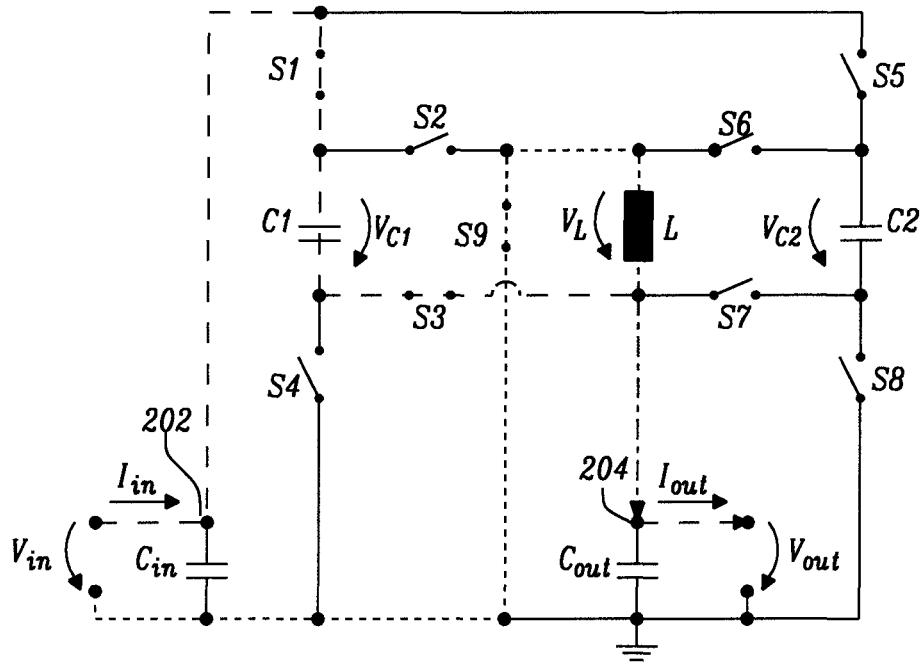
FIG. 5A is a diagram of the DC-DC converter of FIG. 2 operating in an intermediate de-magnetization state.

FIG. 5A illustrates a diagram of the DC-DC converter of FIG. 2 operating in an intermediate de-magnetization state referred to as state I3. The switches S1, S3, and S9 are closed while the remaining switches S2, S4, S5, S6, S7, S8 are open. In the intermediate state I3 the input node 202 is coupled to the output node 204 via the firth path (comprising the switch S1, the first flying capacitor C1 and the switch S3) and a six path also referred to as de-magnetization path.

The de-magnetization path is defined by the de-magnetization switch S9 and the inductor L.

Figure 5B:
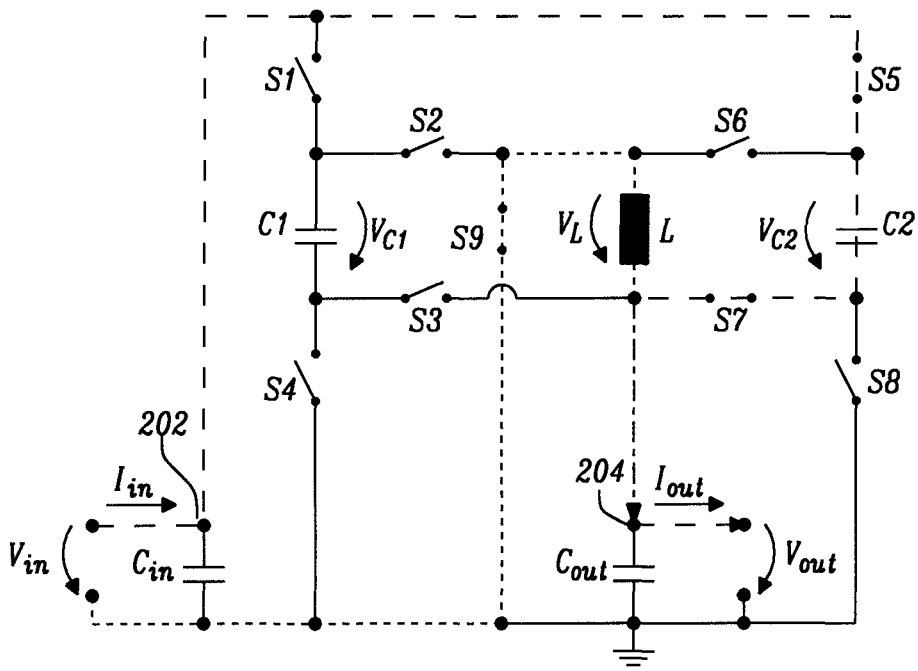
FIG. 5B is a diagram of the DC-DC converter of FIG. 2 operating in another intermediate de-magnetization state.

FIG. 5B illustrates a diagram of the DC-DC converter of FIG. 2 operating in another intermediate de-magnetization state referred to as state I4. The switches S5, S7, and S9 are closed while the remaining switches S1, S2, S3, S4, S6, S8 are open. In the intermediate state I4 the input node 202 is coupled to the output node 204 via the third path (comprising the switch S5, the second flying capacitor C2 and the switch S7) and the six path defined by the de-magnetization switch S9 and the inductor L.

Figure 6:
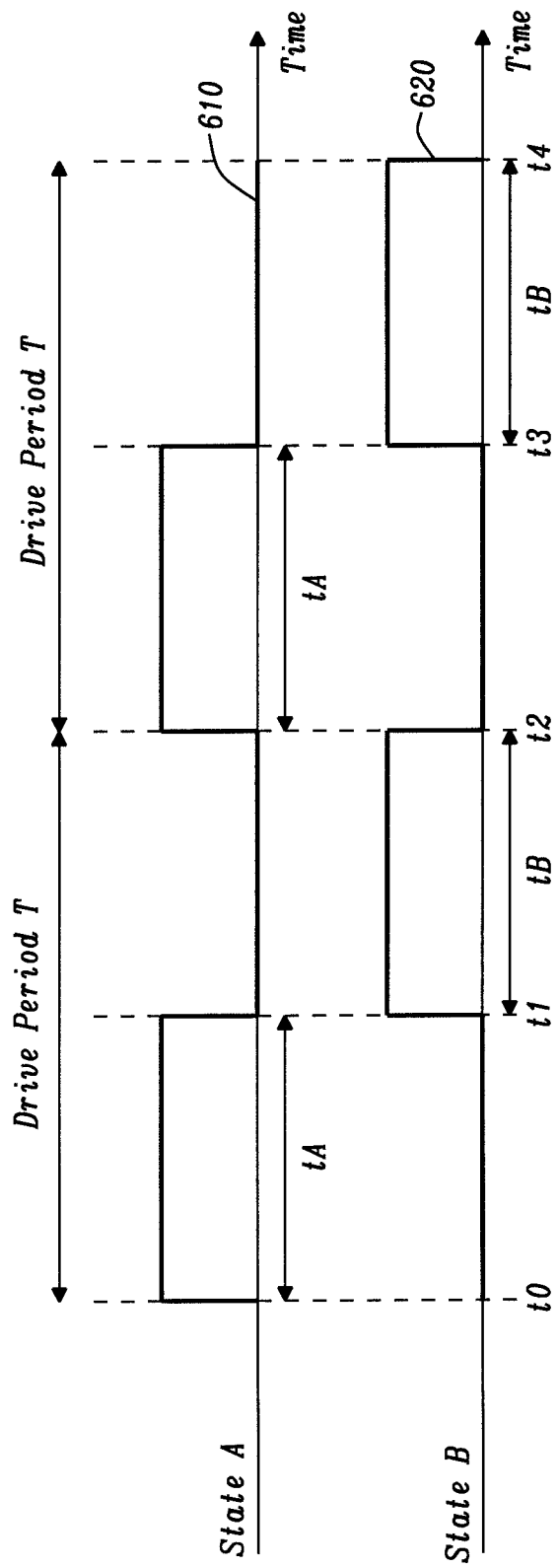
FIG. 6 is a timing diagram illustrating a drive sequence for operating the DC-DC converter of FIG. 2.

FIG. 6 illustrates a drive sequence for operating the DC-DC converter of FIG. 2 with a conversion ratio $$\frac{V_{in}}{V_{out}} = 2.$$

In this example, the driver 220 drives the DC-DC converter 200 with state A (waveform 610), between the times t0 and t1 for a duration TA, then with state B (waveform 620) between the time t1 and t2 for a duration TB. This sequence is then repeated over time to deliver the required output power. For a conversion ratio $$\frac{V_{in}}{V_{out}} = 2, TA = TB = T/2$$

and the driver operates the DC-DC converter for 50% of the time in state A and 50% of the time in state B. As a result 50% of the current provided at the output of the DC-DC regulator does not go through the inductor L. This reduces inductor losses by 75% compared with a conventional DC-DC converter. It will be appreciated that a delay also referred to as dead-time may be introduced at times t1 and t2.

Figure 7:
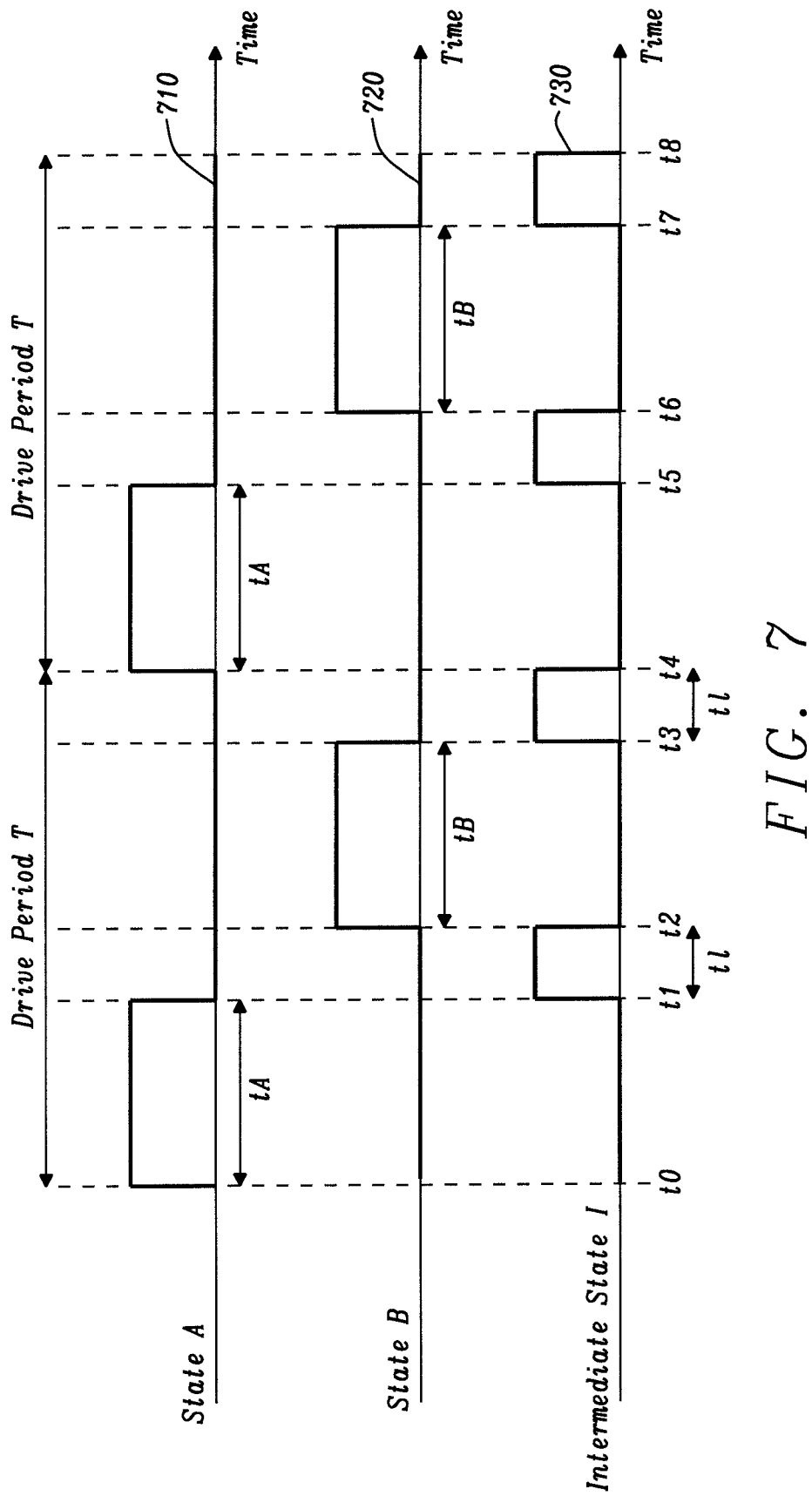
FIG. 7 is a timing diagram illustrating another drive sequence for operation of the DC-DC converter of FIG. 2.

FIG. 7 illustrates another drive sequence for operating the DC-DC converter of FIG. 2. In this example, the driver drives the DC-DC converter with state A (waveform 710), between the times t0 and t1 for a duration TA, with the intermediate state I (waveform 730) between the times t1 and t2 for a duration TI, with state B (waveform 720) between the times t2 and t3 for a duration TB, and then with the intermediate state I between the times t3 and t4. This sequence is then repeated over time to deliver the required output power. It will be appreciated that a dead-time may be introduced at times t1, t2, t3 and t4.

The driver 220 may select the intermediate state I among the intermediate magnetization states I1 and I2 or the de-magnetization states I3 and I4. For instance for a conversion ratio $$\frac{V_{in}}{V_{out}} > 2,$$

leading to lower output voltages, the DC-DC converter should be operated for a predetermined amount of time in the intermediate state I3 or I4. The values of TA, TB and TI may be set to achieve a desired conversion ratio. For instance TA=TB may be set to 40% of the drive period T, and TI may be set to 10% of T such that TA+TB+2TI=T.

It will be appreciated that the driver may select different intermediate state in a same sequence. For instance for a conversion ratio $$\frac{V_{in}}{V_{out}} < 2,$$

a possible sequence may start with State A followed by State I1, then State B, and finish with State I2.

The DC-DC converter 200 provides an improved efficiency together with reduced footprint and height compared with traditional 3-level DCDC topologies. As described above the converter states A, B, I1, I2, I3 and I4 implement a capacitive connection between the input and the output port either via the first path that includes flying capacitors C1 or via the third path that includes the flying capacitor C2. As a result, a current arises from the input port during all switching states. This reduces input ripple noise and improves transient response by readily proving output current upon a sudden load increase.

The flying capacitors C1 and C2 connect the input power source and the input capacitor $C_{in}$ in parallel with the output capacitor $C_{out}$. The effective capacitance provided by the capacitors $C_{in}$ in series with C1 and in parallel with the capacitor $C_{out}$ is greater than the capacitance $C_{out}$. As a result, the DCDC converter provides reduced output voltage ripples. A smaller output capacitor may also be used in comparison with existing converters topologies.

During a rise in load current, the equivalent series resistance ESR of the output capacitance of $C_{out}$ results in an instantaneous voltage drop. This voltage drop is more significant when the converter output current is temporally higher than the average load current. During this period the output capacitor $C_{out}$ is typically charging and needs to toggle its operation towards discharging for the provision of a suddenly increased load current until the current through the inductor has ramped to the changed load current. The output voltage drop is proportional to a delta current defined as the discharge current minus the charge current. A product of the output voltage drop with the capacitor equivalent series resistance is applied to the DC-DC converter. The first and second paths through the flying capacitors C1 and C2 respectively are in a continuous charging state and the additional load current is increasing its level. As a consequence, the current through the flying capacitor is not changing its direction resulting in a reduced output voltage drop. The topology of the DC-DC converter of FIG. 2 may be modified to reduce the voltage rating of the switch S9.

Figure 8:
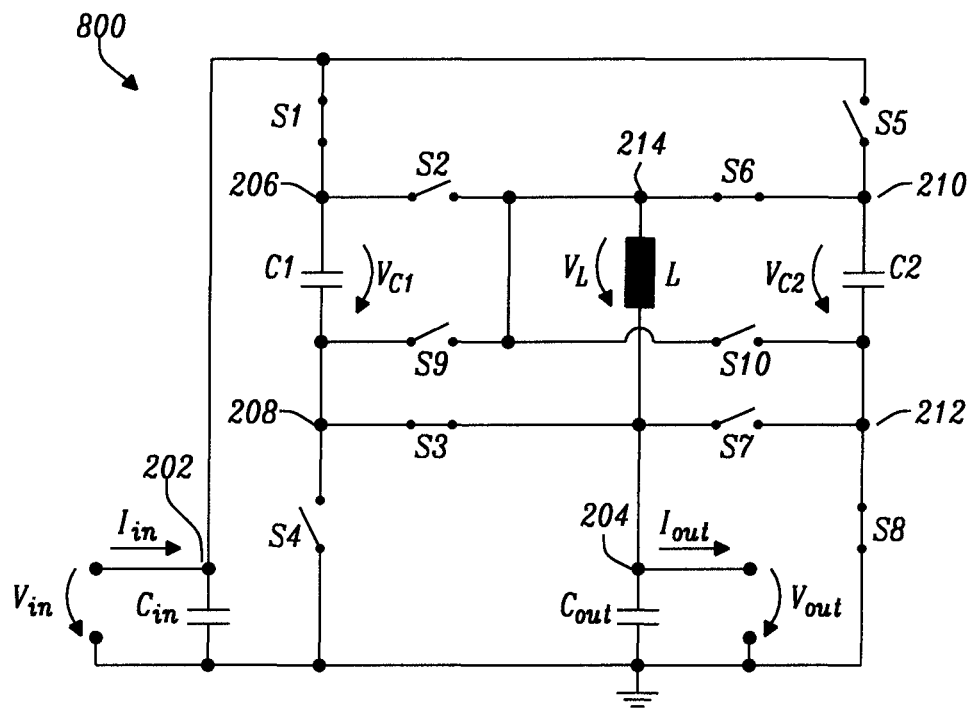
FIG. 8 is a diagram of another DC-DC converter for implementing the method of FIG. 1.

FIG. 8 illustrates another DC-DC converter 800 for implementing the method of FIG. 1. The converter 800 is similar to the converter 200 described with reference to FIG. 2, in which certain parts of the circuit have been added or modified. The same reference numerals have been used to represent corresponding components and their description will not be repeated for sake of brevity.

In this embodiment, the switch S9 has a first terminal coupled to the inductor L at node 214 and a second terminal coupled to the flying capacitor C1 at node 208. Alternatively or in combination, another switch S10 may also be provided. The switch S10 has a first terminal coupled to the inductor L at node 214 and a second terminal coupled to the flying capacitor C2 at node 212.

In operation, the inductor L may be de-magnetized either via the switches S9 and S4 or via the switches S10 and S8 or via both pairs of switches. The optional switch S10 enables the conduction of switch S8 in parallel to S4 during the inductor de-magnetization state. This improves the converter efficiency for output voltages below $V_{in}/2$. The switches S9 and S10 may also be implemented with a reduced voltage rating of $V_{out}$ instead of $V_{in}$.

For a conversion ratio $$\frac{V_{in}}{V_{out}} \geq 2,$$

the converter may be implemented without the switches S9 and S10 hence improving the converter efficiency and reducing its cost.

Figure 9:
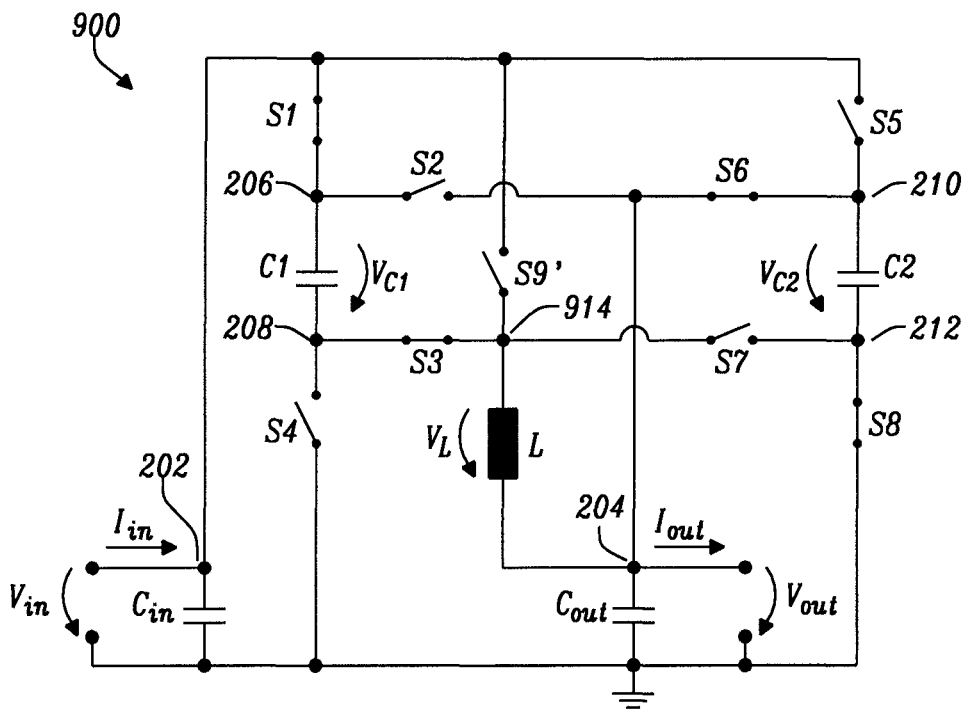
FIG. 9 is a diagram of yet another DC-DC converter for implementing the method of FIG. 1.

FIG. 9 illustrates another DC-DC converter 900 for implementing the method of FIG. 1. The converter 900 is similar to the converter 200 described with reference to FIG. 2, in which certain parts of the circuit have been added or modified. The same reference numerals have been used to represent corresponding components and their description will not be repeated for sake of brevity. In this embodiment, the inductor L has a first terminal coupled to the switch S3 at node 914 and a second terminal coupled to the output node 204. The inductor is coupled to the input via a switch S9' at node 914.

Interleaved switching is provided as follows. In state A, the input node 202 is coupled to the output node 204 via a first path comprising S1, C1, S3 and L. The ground is coupled to the output node 204 via a second path comprising S8, C2 and S6. In state B, the input node 202 is coupled to the output node 204 via a third path comprising S5, C2, S7 and L. The ground is coupled to the output node 204 via a fourth path comprising S4, C1 and S2. Intermediate states may be provided to magnetize or de-magnetize the inductor. The inductor L can be magnetized via S9' and de-magnetized via S3 and S4 or S7 and S8.

The voltage across the flying capacitors C1 and C2 is about $V_{out}$ and for a conversion ratio $$\frac{V_{in}}{V_{out}} = 2$$

the voltage across the inductor L is null. This allows reducing the voltage rating of the low side switches S3, S4, S7 and S8. This topology also reduces the switching noise on $V_{in}$ via the series connection of the inductor L. For a conversion ratio $$\frac{V_{in}}{V_{out}} \geq 2,$$

the converter may be implemented without the switches S9', hence improving further the converter efficient and reducing its cost.

Figure 10:
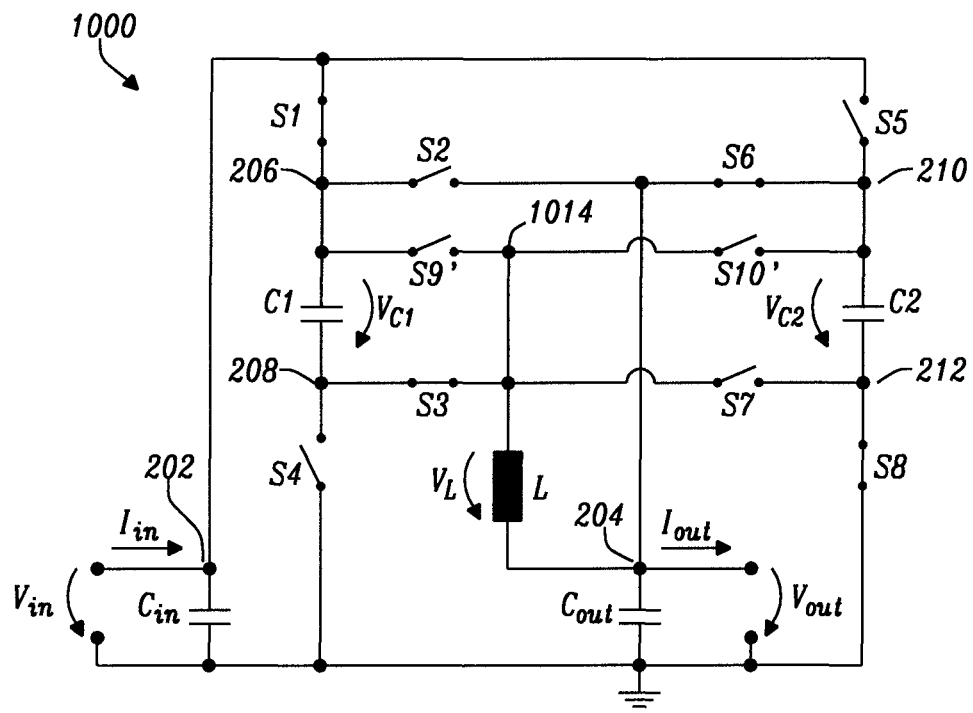
FIG. 10 is a diagram of modified version of the DC-DC converter of FIG. 9.

FIG. 10 is a diagram of a modified version of the DC-DC converter of FIG. 9. In this embodiment the switch S9' has a first terminal coupled to C1 at node 206 and a second terminal coupled to the inductor L at node 1014. Alternatively or in combination an additional switch S10' may be provided. The switch S10 has a first terminal coupled to C2 at node 210 and a second terminal couple to the inductor at node 1014. The inductor L can be magnetized via the switches S1, S9' or via the switches S5 and S10' or via both pair of switches. The switches S9' and S10' may be implemented with a voltage rating lower than Vin. For a conversion ratio $$\frac{V_{in}}{V_{out}} = 2,$$

the converter may be implemented without the switches S9' and S10' hence improving the converter efficient and reducing its cost.

Figure 11:
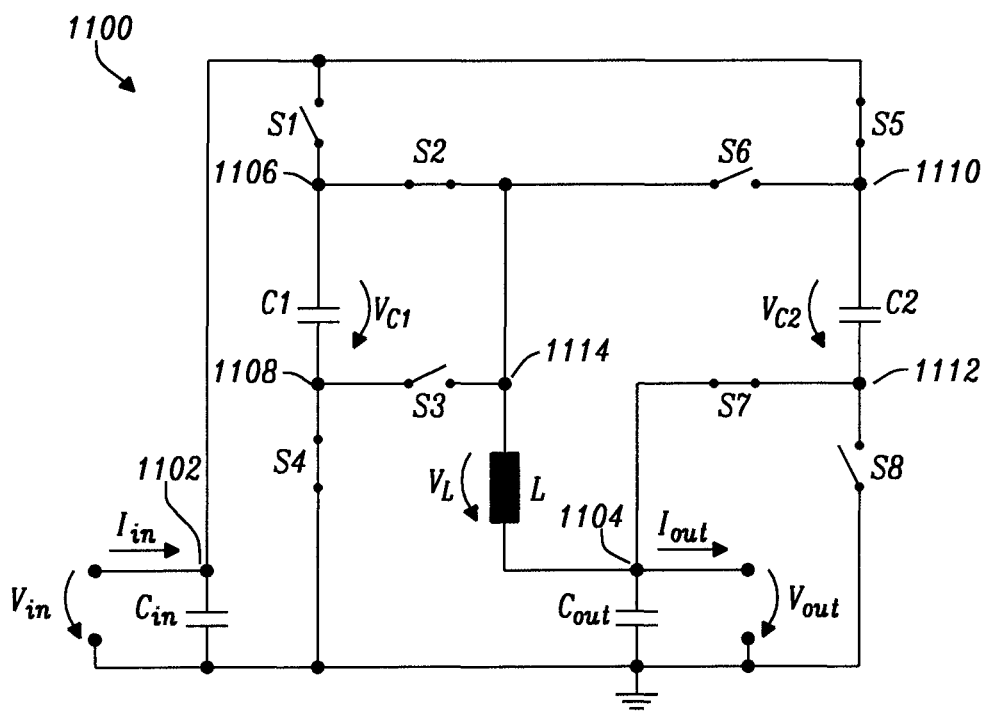
FIG. 11 is a diagram of an asymmetric DC-DC converter for implementing the method of FIG. 1.

FIG. 11 is a diagram of a DC-DC converter implemented with only eight switches. The DC-DC converter 1100 includes two flying capacitors C1 and C2 and an inductor L coupled between an input node 1102 and an output node 1104 via a network of switches formed by eight switches S1, S2, S3, S4, S5, S6, S7 and S8. An input capacitor Cin is provided between the input node 1102 and ground and an output capacitor Cout is provided between the output node 1104 and ground.

The first flying capacitor C1 is coupled to the input node 1102 via the switch S1 and to ground via the switch S4. Similarly, the second flying capacitor C2 is coupled to the input node 1102 via the switch S5 and to ground via the switch S8. The first flying capacitor C1 has a first terminal coupled to node 1106 and a second terminal coupled to node 1108. The second flying capacitor C2 has a first terminal coupled to node 1110 and a second terminal coupled to node 1112. The second flying capacitor C2 is also coupled to the output node 1104 via the switch S7. The inductor L has a first terminal at node 1114 and a second terminal coupled to the output node 1104. The first terminal at node 1114 is coupled to node 1106 via the switch S2, to node 1110 via the switch S6, and to node 1108 via switch S3. A driver not shown is provided to generate a plurality of control signals to operate the switches S1-S8.

In operation the driver operates the converter 1100 using a sequence of states that includes a first state and a second state. In the first state the switches S2, S4, S5 and S7 are closed while the remaining switches S1, S3, S6 and S8 are open. The input node 1102 is coupled to the output node 1104 via a path comprising S5, C2, and S7. The ground is coupled to the output node 1104 via another path comprising S4, C1, S2 and L. In the second state the switches S1, S3, S6 and S8 are closed while the remaining switches S2, S4, S5 and S7 are open. The input node 1102 is coupled to the output node 1104 via a path comprising S1, C1, S3 and L. The ground is coupled to the output node 1104 via another path comprising S8, C2, S6 and L. The second state may last longer than the first state. For instance, the duration of the second state may be twice the duration of the first state.

The topology of the converter of FIG. 11 is referred to as an asymmetric topology as the voltage across C1 may be different from the voltage across C2. The voltage across C2 is $V_{in}-V_{out}$, while the voltage across C1 may take different values between 0 and $V_{in}$. An input current with relatively small variations may be achieved when C1 is charged to about $V_{out}$. In this case the small amplitude variations of the input current may be due to the switching dead time and the de-magnetization of the inductor.

For completeness, it is noted that the converter of FIG. 11 may be operated using an alternative sequence with the voltage across C1 being $V_{in}-V_{out}$. In a first state the switches S1, S3, S5 and S7 are closed while the remaining switches S2, S4, S6 and S8 are open. The input node 1102 is coupled to the output node 1104 via a first path comprising S1, C1, S3 and L. The input is also coupled to the output node 1104 via a second path comprising S5, C2, and S7. Each flying capacitor is therefore individually charged via the first path and the second path respectively. In a second state the switches S1 and S5 are open to discharge the capacitors C1 and C2 and provide the output current. For instance, the duration of the second state may be twice the duration of the first state.

Figure 12:
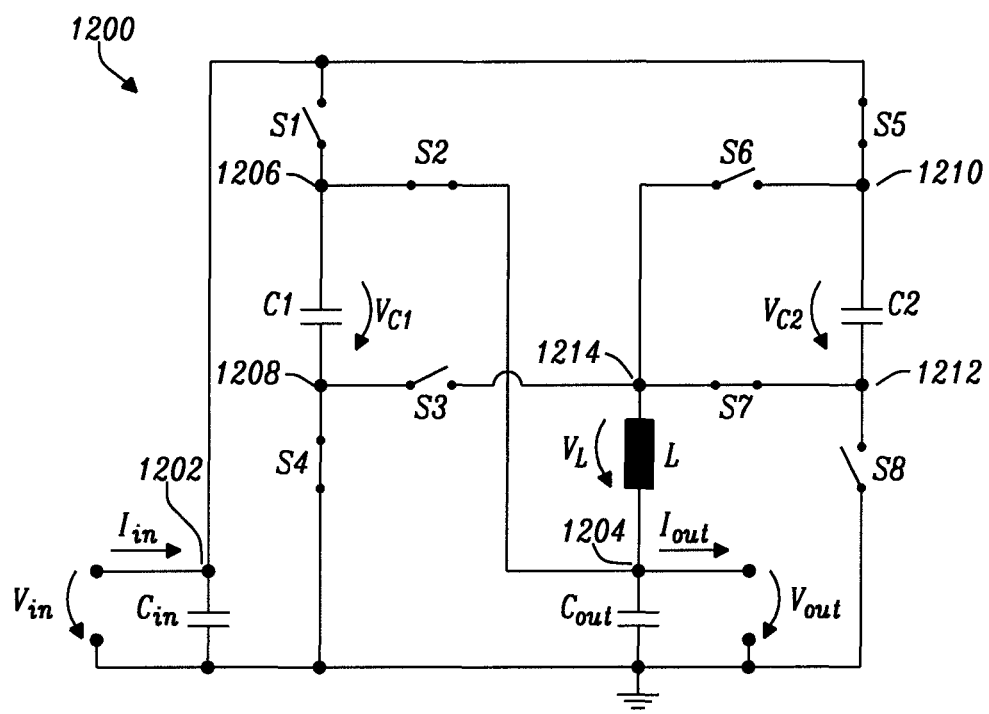
FIG. 12 is a diagram of another asymmetric DC-DC converter for implementing the method of FIG. 1.

FIG. 12 illustrates another asymmetric DC-DC converter. In this embodiment the switch S2 has a first terminal coupled to C1 at node 1206 and a second terminal coupled to the output node 1204. The switch S6 has a first terminal coupled to C2 at node 1210 and a second terminal coupled to the output via the inductor L. The voltage across C1 is $V_{out}$, while the voltage across C2 may take different values between 0 and $V_{in}$.

In operation the driver operates the converter 1200 using a sequence of states that includes a first state and a second state. In the first state the switches S2, S4, S5 and S7 are closed while the remaining switches S1, S3, S6 and S8 are open. The input node 1202 is coupled to the output node 1204 via a path comprising S5, C2, S7 and L. The ground is coupled to the output node 1204 via another path comprising S4, C1 and S2. In the second state the switches S1, S3, S6 and S8 are closed while the remaining switches S2, S4, S5 and S7 are open. The input node 1202 is coupled to the output node 1204 via a path comprising S1, C1, S3 and L. The ground is coupled to the output node 1204 via another path comprising S8, C2, S6 and L. The second state may last longer than the first state. For instance, the duration of the second state may be twice the duration of the first state. In the embodiment of FIGS. 11 and 12 the maximum share of output current bypassing the inductor is 25%.

For completeness, it is noted that the converter of FIG. 12 may be operated using an alternative sequence in which the switching is non-interleaved and the voltage across C2 is $V_{out}$. In a first state the switches S1, S3, S5 and S7 are closed while the remaining switches S2, S4, S6 and S8 are open. The input node 1202 is coupled to the output node 1204 via a first path comprising S1, C1, S3 and L. The input is also coupled to the output node 1204 via a second path comprising S5, C2, S7 and L. Each flying capacitor is therefore individually charged via the first path and the second path respectively. In a second state the switches S2, S4, S6 and S8 are closed while the remaining switches S1, S3, S5 and S7 are open. The ground node is coupled to the output node 1204 via a third path comprising S4, C1 and S2. The ground is also coupled to the output node 1204 via a fourth path comprising S8, C2, S6 and L. For instance, the duration of the first state may be twice the duration of the second state.

The DC-DC converters described in relation to FIGS. 2 to 12 have been described as step-down converters also referred to as Buck converters. It will be appreciated that the DC-DC converters of FIG. 2 to 12 may be operated in reverse (that is using the input as the output and the output as the input) as Boost converters to achieve step-up conversion. Alternatively, step-up conversion may be achieved by modifying the switching sequence.

Figure 13A:
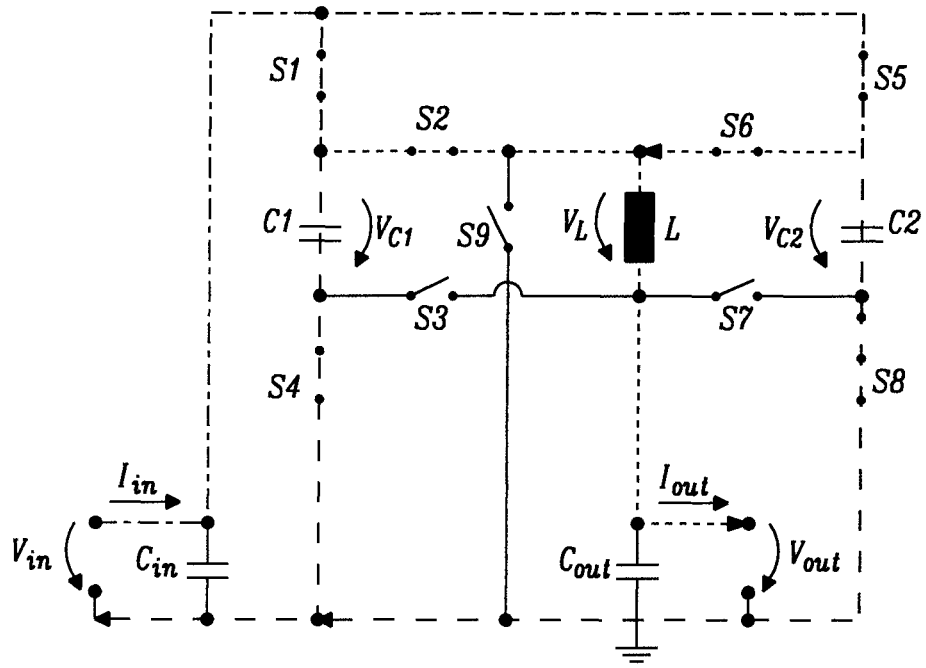
FIG. 13A is a diagram of the DC-DC converter of FIG. 2 operating in a first up-conversion state.
Figure 13B:
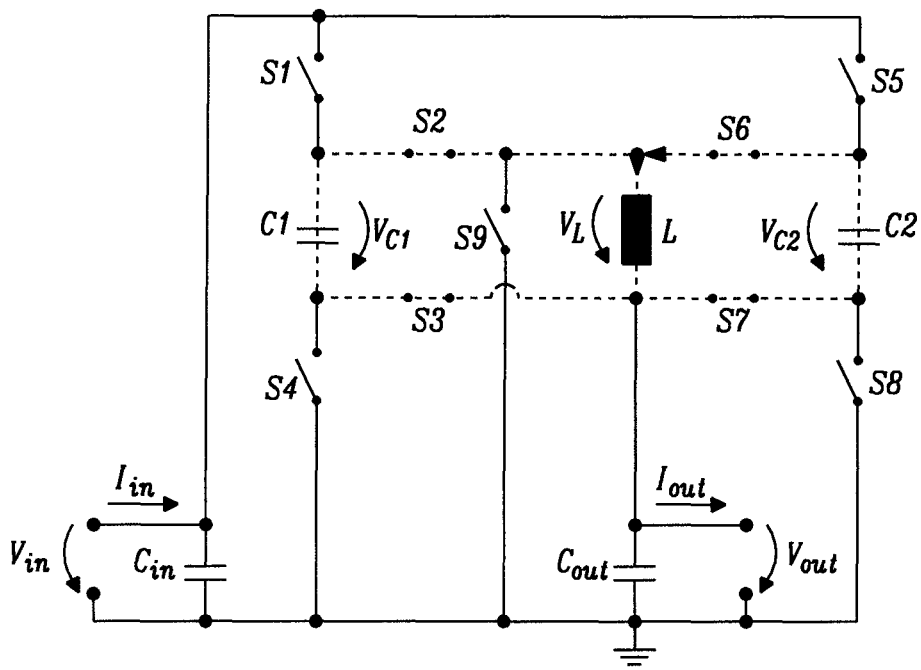
FIG. 13B is a diagram of the DC-DC converter of FIG. 2 operating in a second up-conversion state.

FIG. 13 illustrates a sequence of states for operating the DC-DC converter of FIG. 2 as a boost converter. FIG. 13A shows the states of the switches in a first up-conversion state. The switches S1, S2, S4, S5, S6 and S8 are closed while the remaining switches S3, S7 and S9 are open. The input node 202 is coupled to the output node 204 via two inductor paths comprising the switches S1, S2, L and S5, S6, L respectively, hence de-magnetizing the inductor. The input is coupled to ground via a path comprising S1, C1 and S4, and another path comprising S5, C2 and S8 hence charging the first and second capacitors C1 and C2 to $V_{in}$ respectively. FIG. 13B shows the states of the switches in a second up-conversion state. The switches S2, S3, S6 and S7 are closed while the remaining switches S1, S4, S5 and S8 are open. In this state the capacitors C1 and C2 transfer their energy into the inductor L, hence magnetizing the inductor. Under light load conditions step-up conversion may be achieved using a single path, hence switching for instance only capacitor C1 by closing S1, S2 and S4 or S2 and S3. Using a single phase further reduces the switching losses.

A skilled person will appreciate that variations of the disclosed arrangements are possible without departing from the disclosure. For instance the flying capacitors may be implemented as single or multiple capacitors connected in series and/or in parallel. Alternatively a capacitor network may be used. Such a capacitor network may change configuration during the operation of the converter. Accordingly, the above description of the specific embodiment is made by way of example only and not for the purposes of limitation. It will be clear to the skilled person that minor modifications may be made without significant changes to the operation described.

What is claimed is:

1. A power converter for providing an output voltage with a target conversion ratio, the power converter having a ground port, a first port and a second port, wherein when the power converter operates as a step-down converter the first port receives an input voltage and the second port provides the output voltage and when the power converter operates as a step-up converter the second port receives an input voltage and the first port provides the output voltage; the power converter further comprising an inductor;
a first flying capacitor selectively coupled to the inductor;
a second flying capacitor selectively coupled to the inductor;
a network of switches; and
a driver adapted to drive the network of switches with a sequence of states during a drive period, the sequence of states comprising a first state and a second state,
wherein in the first state one of the first port and the ground port is coupled to the second port via a first path comprising the first flying capacitor and which bypasses the inductor, and wherein the remaining port among the first port and the ground port is coupled to the second port via a second path comprising the second flying capacitor and the inductor, so that when one flying capacitor among the first and second flying capacitors draws a current from the first port, the other flying capacitor draws a current from the ground port,
wherein in the second state one of the first port and the ground port is coupled to the second port via a third path comprising the second flying capacitor and which bypasses the inductor, and wherein the remaining port among the first port and the ground port is coupled to the second port via a fourth path comprising the first flying capacitor and the inductor.

2. The power converter as claimed in claim 1, wherein the sequence comprises an intermediate state, the driver being adapted to select the intermediate state among a plurality of intermediate states based on the target conversion ratio.

3. The power converter as claimed in claim 2, wherein the intermediate state is provided between the first state and the second state.

4. The power converter as claimed in claim 2, wherein in the intermediate state the first port is coupled to the second port via at least one of the first path and the third path and wherein the first port is additionally coupled to the second port via a fifth path comprising the inductor, wherein when the power converter operates as a step-down converter the intermediate state is a magnetization state, and when the power converter operates as a step-up converter the intermediate state is a de-magnetization state.

5. The power converter as claimed in claim 2, wherein in the intermediate state the first port is coupled to the second port via at least one of the first path and the third path and wherein the ground port is coupled to the second port via a sixth path comprising the inductor, wherein when the power converter operates as a step-down converter the intermediate state is a de-magnetization state, and when the power converter operates as a step-up converter the intermediate state is a magnetization state.

6. The power converter as claimed in claim 2, wherein the driver is adapted to change a duration of the intermediate state based on the target conversion ratio.

7. The power converter as claimed in claim 1, wherein the driver is adapted to maintain the first state and the second state for a predetermined duration during the drive period.

8. The power converter as claimed in claim 1, wherein in the second state the first port is coupled to the second port via a seventh path comprising the second flying capacitor and the inductor and wherein the ground port is coupled to the second port via an eighth path comprising the first flying capacitor and the inductor.

9. The power converter as claimed in claim 1, wherein the network of switches comprises
a first switch to couple the first flying capacitor to the first port;
a second switch to couple the second flying capacitor to the first port;
a first ground switch to couple the first flying capacitor to the ground port;
a second ground switch to couple the second flying capacitor to the ground port;
wherein the inductor has a first terminal and a second terminal, the second terminal being coupled to the second port.

10. The power converter as claimed in claim 9, wherein each one of the first flying capacitor and the second flying capacitor has a first terminal selectively coupled to the first port and a second terminal selectively coupled to the ground port; wherein the network of switches comprises
a first capacitor switch coupled to the first terminal of the first flying capacitor;
a second capacitor switch coupled to the first terminal of the second flying capacitor;
a third capacitor switch coupled to the second terminal of the first flying capacitor; and
a fourth capacitor switch coupled to the second terminal of the second flying capacitor.

11. The power converter as claimed in claim 10, wherein the third capacitor switch and the fourth capacitor switch are coupled to the second port.

12. The power converter as claimed in claim 11, wherein the first terminal of the inductor is coupled to the first flying capacitor via the first capacitor switch and to the second flying capacitor via the second capacitor switch.

13. The power converter as claimed in claim 12 comprising a first additional switch provided between the first terminal of the inductor and the ground port or between the first terminal of the inductor and the first ground switch.

14. The power converter as claimed in claim 13 comprising a second additional switch provided between the first terminal of the inductor and the second ground switch.

15. The power converter as claimed in claim 10, wherein the first capacitor switch and the second capacitor switch are coupled to the second port, and wherein the first terminal of the inductor is coupled to the first flying capacitor via the third capacitor switch and to the second flying capacitor via the fourth capacitor switch; wherein the converter further comprises another additional switch coupled to the first terminal of the inductor.

16. The power converter as claimed in claim 15, wherein the additional switch is coupled to the first port or to the first terminal of the first or second flying capacitor.

17. The power converter as claimed in claim 10, wherein the first terminal of the inductor is coupled to the first flying capacitor via the first capacitor switch and the third capacitor switch; and wherein the first terminal of the inductor is coupled to the second flying capacitor via the second capacitor switch.

18. The power converter as claimed in claim 10, wherein the first terminal of the inductor is coupled to the first flying capacitor via the third capacitor switch and to the second flying capacitor via the second capacitor switch and the fourth capacitor switch; wherein the first capacitor switch is coupled to the second port.

19. A method of converting power with a target conversion ratio, the method comprising
providing a power converter having a ground port, a first port and a second port wherein when the power converter operates as a step-down converter the first port receives an input voltage and the second port provides an output voltage and when the power converter operates as a step-up converter the second port receives an input voltage and the first port provides an output voltage;

the power converter further comprising an inductor; a first flying capacitor selectively coupled to the inductor; a second flying capacitor selectively coupled to the inductor; and a network of switches; and driving the network of switches with a sequence of states during a drive period, the sequence of states comprising a first state and a second state;

wherein in the first state one of the first port and the ground port is coupled to the second port via a first path comprising the first flying capacitor and which bypasses the inductor, and wherein the remaining port among the first port and the ground port is coupled to the second port via a second path comprising the second flying capacitor and the inductor, so that when one flying capacitor among the first and second flying capacitors draws a current from the first port, the other flying capacitor draws a current from the ground port, wherein in the second state one of the first port and the ground port is coupled to the second port via a third path comprising the second flying capacitor and which bypasses the inductor, and wherein the remaining port among the first port and the ground port is coupled to the second port via a fourth path comprising the first flying capacitor and the inductor.

* * * * *